United States Patent [19]

Kerkman et al.

[11] Patent Number: 5,502,360
[45] Date of Patent: Mar. 26, 1996

[54] STATOR RESISTANCE DETECTOR FOR USE IN ELECTRIC MOTOR CONTROLLERS

[75] Inventors: Russel J. Kerkman, Milwaukee; Brian J. Seibel, Grafton; Doyle Busse, Muskego, all of Wis.

[73] Assignee: Allen-Bradley Company, Inc., Milwaukee, Wis.

[21] Appl. No.: 401,522

[22] Filed: Mar. 10, 1995

[51] Int. Cl.$^6$ .................................. H02P 7/00; H02P 5/40
[52] U.S. Cl. ......................... 318/805; 318/800; 318/811; 363/71; 363/97
[58] Field of Search ................................. 318/700–838, 318/138, 245, 354; 323/207, 208, 205, 209, 210; 363/40, 71, 97, 98

[56] References Cited

U.S. PATENT DOCUMENTS

| | | | |
|---|---|---|---|
| 4,451,771 | 5/1984 | Nagase et al. | 318/800 |
| 4,680,526 | 7/1987 | Okuyama et al. | 318/802 |
| 4,724,373 | 2/1988 | Lipo | 318/805 |
| 4,958,117 | 9/1990 | Kerkman et al. | 318/805 |
| 5,032,771 | 7/1991 | Kerkman et al. | 318/805 |
| 5,140,248 | 8/1992 | Rowan et al. | 318/811 |
| 5,278,485 | 1/1994 | Kim | 318/802 |
| 5,278,486 | 1/1994 | Kim | 318/811 |
| 5,298,847 | 3/1994 | Kerkman et al. | 318/800 |
| 5,329,217 | 7/1994 | Kerkman | 318/811 |
| 5,341,081 | 8/1994 | Yamada | 318/800 |
| 5,365,158 | 11/1994 | Tanaka et al. | 318/806 |
| 5,390,102 | 2/1995 | Araki | 363/71 |
| 5,400,240 | 3/1995 | Araki | 318/800 |

*Primary Examiner*—Paul Ip
*Attorney, Agent, or Firm*—Michael A. Jaskolski; John M. Miller; John J. Horn

[57] ABSTRACT

A non-invasive system for accurately determining the stator resistance in an electric motor during motor operation. The system includes a mechanism for determining the phase angle of the stator current within the dq frame of reference and a mechanism for transforming feedback voltages into a new frame of reference defined by this phase angle. Counter EMFs are detected which are free of stator resistance and used to force the counter EMF components of the stator winding voltages to conform to desired values. The stator resistance is then derived using simple mathematical relationships between the resistance, stator current, feedback voltage and known counter EMF values.

14 Claims, 7 Drawing Sheets

LOW SPEED SLIP CONTROL

HIGH SPEED SLIT CONTROL (>30Hz)

FLUX CONTROL

STATOR RESISTANCE DETECTOR FOR USE IN ELECTRIC MOTOR CONTROLLERS

FIELD OF THE INVENTION

The present invention relates to systems for controlling electric motors and, more particularly, to a system for deriving an accurate stator resistance estimate for use by electric motor controllers.

DESCRIPTION OF THE ART

Induction Motors

Induction motors have broad application in industry, particularly when large horsepower is needed. A three phase induction motor receives three phases of electrical voltage to produce a rotating magnetic stator field. A rotor contained within the stator field experiences an induced current (hence the term induction) which generates a rotor field. The interaction of the rotor field and the stator field causes rotation of the rotor.

A common rotor design is a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field.

The use of this induced current to generate the rotor field eliminates the need for slip rings or brushes to provide power to the rotor, making the design relatively maintenance free.

Field Oriented Control Of Induction Machines

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator field. An increase in slip increases the rate at which flux lines are cut by the rotor, increasing the rotor generated field and thus the force or torque between the rotor and stator fields.

Referring to FIG. 9, the rotating phasor 1 of the stator magneto motive force ("mmf") will generally have some angle α with respect to the phasor of rotor flux 2. The torque generated by the motor will be proportional to the magnitudes of these phasors 1 and 2 but also will be a function of their angle α. The maximum torque is produced when phasors 1 and 2 are at right angles to each other (e.g., α=32 90°) whereas zero torque is produced if these phasors are aligned (e.g., α=0°). The phasor 1 may therefore be usefully decomposed into a torque producing component 3 perpendicular to the phasor 2 and a flux component 4 parallel to rotor flux phasor 2.

These two components 3 and 4 of the stator mmf are proportional, respectively, to two stator currents $i_{qe}$, a torque producing current, and $i_{de}$, a flux producing current, which may be represented by orthogonal vectors in the rotating frame of reference (synchronous frame of reference) of the stator flux having slowly varying magnitudes.

Accordingly, in controlling an induction motor, it is generally desired to control not only the frequency of the applied voltage (hence the speed of the rotation of the stator flux phasor 1) but also the phase of the applied voltage relative to the current flow and hence the division of the currents through the stator windings into the $i_{qe}$ and $i_{de}$ components. Control strategies that attempt to independently control the currents $i_{qe}$ and $i_{de}$ are generally termed field oriented control strategies ("FOC").

Ideally, the torque is established by the applied voltage and slip of the invertor. In reality, however, various other operating parameters that change during motor operation alter the torque-slip relationship. Therefore, where precise motor operation is required, various feedback loops are used to monitor stator winding currents and voltages and/or motor speed.

The controller uses feedback information to determine how the invertor supplied voltage must be altered to compensate for system disturbances due to changing operating parameters, and then adjusts control signals to ensure the correct invertor voltage is supplied. Unfortunately, the machine parameter values that establish the invertor supplied voltage change over time. The changing motor parameter values make controller adjustments ineffective when variations in operating parameter values are not accounted for.

For example, the production of any given set of currents $i_{qe}$ and $i_{de}$ requires that the stator be excited with voltages $V_{qe}$ and $V_{de}$ as follows:

$$V_{qe} = r_s i_{qe} + \omega_e \lambda_{de} \quad (1)$$

$$V_{de} = r_s i_{de} - \omega_e \lambda_{qe} \quad (2)$$

where:

$V_{qe}$, $V_{de}$=terminal voltages;

$r_s$=stator resistance;

$i_{qe}$, $i_{de}$=terminal current components;

$\omega_e$=electrical field frequency;

$\lambda_{de}$, $\lambda_{qe}$=flux linkage components;

and where:

$r_s i_{de}$, $r_s i_{qe}$=invertor supplied voltages; and $\omega_e \lambda_{de}$, $\omega_e \lambda_{qe}$=counter electromotive forces (EMFs).

Stator resistance $r_s$ changes with temperature and stator winding temperature increases as the average current through the winding increases. Thus, in a variable speed motor, when invertor supplied voltage and current is increased or decreased, stator resistance $r_s$ is subject to change which in turn results in an unexpected demand in stator voltage.

Similarly, the counter EMFs are affected by stator winding current adjustments. The rotor field, which is indirectly induced by the stator winding current, itself induces a current in the stator windings resulting in the counter EMFs. Thus, any change in stator winding current indirectly changes counter EMF values.

Complicating matters further, the stator resistance $r_s$ and counter EMFs change by varying degrees when the stator winding current is adjusted. Thus, in order to achieve precise motor control, precise determination of both stator resistance $r_s$ and counter EMFs would be helpful.

U.S. Pat. No. 5,298,847, issued Mar. 29, 1994, describes one way to accurately determine a counter EMF in an electric motor by determining the phase angle of the stator current within the dq frame of reference and transforming feedback voltages into a new d'q' frame of reference defined by a phase angle. In the new d'q' frame of reference, stator current $i_s$ is in quadrature with the d'-axis voltage component $V'_{de}$ and thus, there is no $r_s i$ component on the d'-axis. The d'-axis voltage is the counter EMF $\omega_e \lambda'_{qe}$ and thus, the counter EMF $\omega_e \lambda'_{qe}$ can be found.

Unfortunately, no simple and precise method to determine stator resistance $r_s$ has been developed. Some methods to estimate stator resistance $r_s$ that are presently used in the industry require massive amounts of CPU time in order to determine and update stator resistance values and the resulting values often are not sufficiently accurate. Others link the estimator to a control loop that incorporates a pure integrator. These too are normally insufficiently accurate.

The industry has also developed ways to measure stator resistance $r_s$ directly by injecting test signals into the stator windings and observing alterations in motor parameters. However, such signal injections inevitably result in motor system disturbances which are unacceptable where precise motor operation is required.

Thus, it would be advantageous to have a non-invasive, non-disturbing method and/or apparatus that could dynamically and accurately determine stator resistance during motor operation without requiring a huge amount of processor time.

SUMMARY OF THE INVENTION

The present invention comprises a non-invasive system for accurately determining stator resistance values in an electric motor during motor operation. The system of the present invention includes a mechanism for determining the phase angle of the stator current within a dq frame of reference and a mechanism for transforming feedback voltages within the dq frame of reference into a new d'q' frame of reference wherein the q'-axis is in phase with the stator current and the d'-axis is in quadrature therewith. Because the stator current is in quadrature with the d'-axis, there is no $r_s i$ component in the d'-axis. Thus, the d'-axis feedback voltage component $V'_{deF}$ is equal to the counter EMF $\omega_e \lambda'_{qe}$. By comparing the counter EMF $\omega_e \lambda'_{qe}$ to the commanded counter EMF $\omega_e \lambda'_{qe}*$, a counter EMF error is derived. The error can be eliminated by forcing the counter EMF $\omega_e \lambda'_{qe}$ to be identical to a commanded counter EMF $\omega_e \lambda'_{qe}*$. When this is done, both the q' and d'-axis counter EMFs are controlled and equal the commanded counter EMFs $\omega_e \lambda'_{de}*$, $\omega_e \lambda'_{qe}*$ respectively.

Once the counter EMFs $\omega_e \lambda'_{de}$, $\omega_e \lambda'_{qe}$ are forced to conform to the commanded counter EMFs $\omega_e \lambda'_{de}*$, $\omega_e \lambda'_{qe}*$, the q'-axis invertor supplied current $i'_{qe}$ is equal to a q'-axis command current $i_{qe}'*$ because there is no d'-axis command current component $i_{de}'*$. Thus, Equation 1 can be rewritten as:

$$V'_{qeF} = r_s i_{qe}'* + \omega_e \lambda_{de}'* \quad (3)$$

Solving Equation 3 for the stator resistance $r_s$:

$$\hat{r}_s = \frac{V'_{qeF} - \omega_e \lambda_{de}'*}{i_{qe}'*} \quad (4)$$

Deriving a stator resistance estimate $\hat{r}_s$ is then simply a matter of subtracting the q'-axis command counter EMF ($\omega_e \lambda_{de}'*$) from the q'-axis feedback voltage $V'_{qeF}$ and dividing by the q'-axis command current ($i_{qe}'*$).

DESCRIPTION OF THE PREFERRED EMBODIMENT

In the description that follows, an "*" denotes a "command" signal, an "e" subscript denotes that a signal is referred to the synchronous reference frame, an "s" subscript denotes that a signal is referred to the stationary frame of reference and an "F" subscript denotes that a signal is a feedback signal.

In addition, for the purposes of the following description, due to the phase shift between current and voltage and cross coupling of the speed voltages, d-axis voltage parameters relate to torque/slip and q-axis voltage parameters relate to flux while d-axis current parameters relate to flux and q-axis current parameters relate to torque/slip. In order to simplify this explanation, however, parameters will simply be referred to their respective d, q, d' and q'-axis.

As well known, a voltage phasor is a function of various operating characteristics such that in steady state d and q-axis voltage components in a rotating frame of reference can be expressed according to Equations 1 and 2 above.

Thus, each voltage component $V_{qe}$, $V_{de}$ in steady state is the sum of two voltages, an invertor supplied voltage represented by an $r_s i$ term and a counter EMF represented by an $\omega_e \lambda$ term. The invertor supplied voltages $r_s i$ result from the stator current flowing through stator windings wherein the windings have a combined resistance $r_s$.

The counter EMFs result from rotation of the dq reference frame at an angular velocity $\omega_e$. In the synchronous frame, the stator flux linkages produce the counter EMFs, thus affecting stator winding voltages.

Figure 1A:
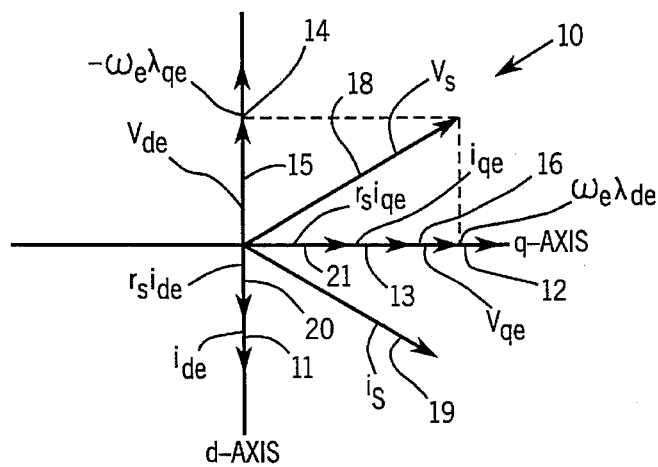
FIGS. 1(a)–1(c) provide three graphs in the dq frame of reference showing a number of important electrical quantities characteristic of the operation of an AC induction motor.

Referring to FIG. 1(a), the graph 10 depicts the vectorial relationships between the invertor supplied and counter EMF voltages and the voltage and current phasors within a rotating d-q frame of reference. Included in FIG. 1(a) are a stator voltage phasor 18 ($V_s$) and a stator current phasor 19 ($i_s$) related to and lagging behind the voltage phasor 18. Also included on FIG. 1(a) are the invertor supplied voltages 20, 21 ($r_s i_{de}$, $r_s i_{qe}$), counter EMFs 12, 14 ($\omega_e \lambda_{de}$, $\omega_e \lambda_{qe}$), d and q-axis current components 11, 13 ($i_{qe}$, $i_{de}$), and d and q-axis voltage components 15, 16 ($V_{de}$, $V_{qe}$).

The stator current phasor 19 ($i_s$) can be expressed as:

$$i_s = i_{qe} + j i_{de} \quad (5)$$

and the stator voltage phasor 18 can be expressed as:

$$V_s = V_{qe} + j V_{de} \quad (6)$$

where the real components of Equations 5 and 6 are functions of stator resistivity and the imaginary components are functions of inductance and thus are frequency dependant.

Clearly, referring also to Equations 1 and 2, in order to ascertain either of the counter EMF voltages $\omega_e \lambda_{de}$, $\omega_e \lambda_{qe}$ from the d and q axis voltages 15, 16 ($V_{qe}$ or $V_{de}$), it is necessary to determine the value of an associated invertor supplied voltage $r_s i_{qe}$ or $r_s i_{de}$. Similarly, any attempt to determine stator resistance based on the d and q-axis voltages $V_{qeF}$, $V_{deF}$ leads to inherent contamination by one or the other counter EMFs 12, 13 ($\omega_e \lambda_{de}$, or $\omega_e \lambda_{qe}$).

Importantly, for purposes of the present invention, by performing a coordinate transformation on the d and q-axis voltages 15, 16 ($V_{de}$, $V_{qe}$), the stator voltage 18 ($V_s$) can be observed in a new frame of reference which simplifies its expression and facilitates control of the counter EMF components and determination of the stator resistance $r_s$.

Figure 1B:
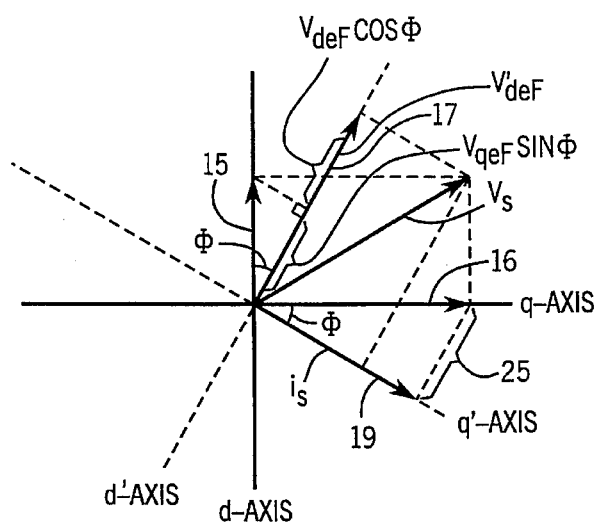

Referring to FIG. 1(b) the current phasor 19 ($i_s$) lags the q-axis by a conversion angle Φ. A new coordinate system can be chosen by shifting the q-axis by the conversion angle Φ such that a new q-axis (i.e. a q'-axis) is in phase with the current phasor 19 ($i_s$) and a new d'-axis is in quadrature therewith. Then, by performing a coordinate transformation on the d and q-axis voltages 15, 16 ($V_{de}$, $V_{qe}$) both d' and q'-axis voltages 17, 29 ($V'_{deF}$, $V'_{qeF}$, see FIG. 1(c)) can be derived.

Referring still to FIG. 1(b) the d'-axis voltage $V'_{deF}$ is in quadrature with the current phasor 19 ($i_s$). The d'-axis invertor supplied voltage ($r_s i'_{de}$) is therefore zero because the d'-axis current component $i'_{de}$ is zero. In the d'q' frame of reference, Equation 2 simplifies to:

$$V'_{deF} = -\omega_e \lambda'_{qe} \quad (7)$$

By comparing the d'-axis counter EMF $\omega_e \lambda'_{qe}$ to a d'-axis command counter EMF $\omega_e \lambda_{qe}'^*$, a d'-axis voltage error $V'_{derr}$ can be derived. The controller can then compensate for the d'-axis voltage error $V'_{derr}$ to drive the motor at the d'-axis commanded counter EMF $\omega_e \lambda_{qe}'^*$.

As well known in the art, because the counter EMFs $\omega_e \lambda'_{qe}$, $\omega_e \lambda'_{de}$ are interrelated (i.e. to change one, both must be altered), when one counter EMF is corrected the other counter EMF is automatically corrected. In the present case, when the d'-axis counter EMF $\omega_e \lambda'_{qe}$ is corrected and forced to equal the d'-axis con, hand counter EMF $\omega_e \lambda_{qe}'^*$, the q'-axis counter EMF $\omega_e \lambda'_{de}$ is corrected and forced to equal the q'-axis command counter EMF $\omega_e \lambda_{de}'^*$.

Referring again to Equation 4, after sensing the q-axis voltage $V_{qe}$, transforming the q-axis voltage $V_{qe}$ to the d'q' frame of reference to produce the q'-axis voltage $V'_{qeF}$, and deriving the q'-axis command counter EMF $\omega_e \lambda_{de}'^*$ and current $i_{qe}'^*$ values, an accurate stator resistance estimate $\hat{r}_s$ can be derived.

Figure 2:
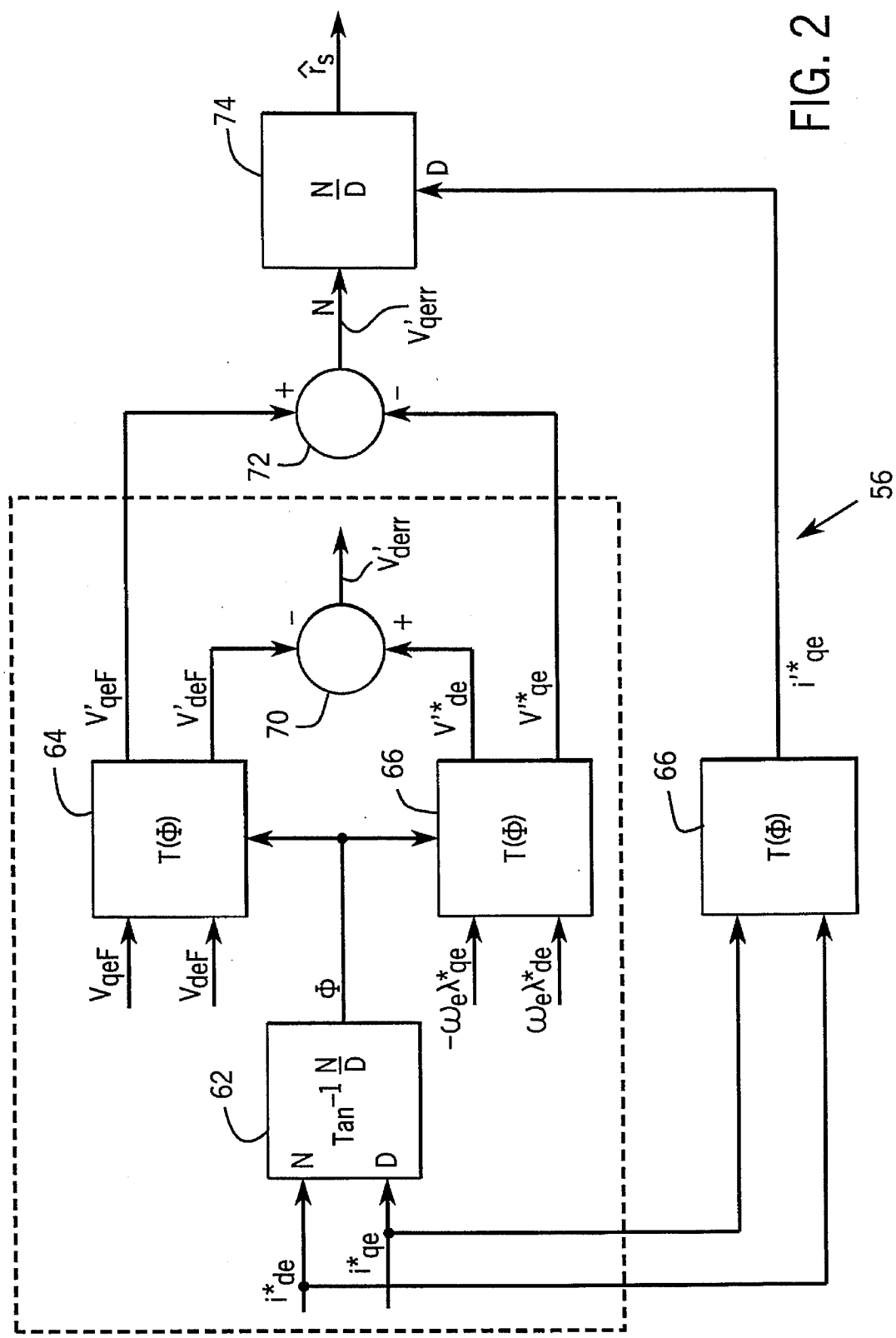
FIG. 2 provides a block diagram of a converter system which utilizes the present invention in generating both a voltage error signal and a stator resistance estimate.

Referring now to FIG. 2, a stator resistance identifier 56 may be implemented using hardware but more often will be implemented using software run on a standard motor controlling microprocessor such as a model 8096 microelectronic processor as supplied by Intel Corporation of Santa Clara, Calif. The stator resistance identifier 56 includes seven operational blocks 62, 64, 66, 68, 70, 72, and 74 for receiving six inputs $V_{qeF}$, $V_{deF}$, $i^*_{de}$, $i^*_{qe}$, $\omega_e \lambda^*_{qe}$, and $\omega_e \lambda^*_{de}$ representing synchronous digital d and q-axis voltage feedback signals, current command signals, and counter EMF command signals respectively. The identifier 56 generates both a d'-axis counter EMF error signal $V'_{derr}$ and a stator resistance estimate $\hat{r}_s$ for use in motor control.

In block 62 a ratio $i^*_{de}/i^*_{qe}$ of command currents is formed and the arc tangent of this ratio is taken to generate the conversion angle Φ representing the angular displacement between the q-axis and the q'-axis shown in FIG. 1(b). In the block 64, the voltage feedback signals $V_{qeF}$ and $V_{deF}$ undergo a coordinate transformation as a function of the conversion angle Φ to yield d' and q'-axis voltage signals $V'_{qeF}$ and $V'_{deF}$. Referring also to FIG. 1(b), the d'-axis voltage signal $V'_{deF}$ is derived according to Equation 6 below:

$$V'_{deF} = V_{deF} \cos \Phi - V_{qeF} \sin \Phi \quad (8)$$

Figure 1C:
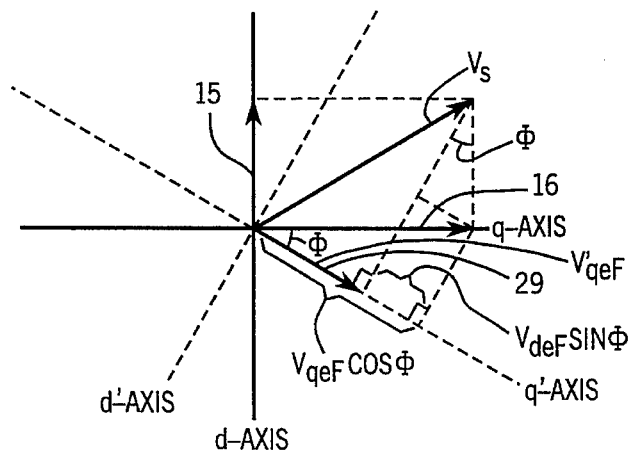

Similarly, referring to FIG. 1(c), the q'-axis voltage signal $V'_{qeF}$ can be derived according to Equation 7 below:

$$V'_{qeF} = V_{qeF} \cos \Phi + V_{deF} \sin \Phi \quad (9)$$

In the block 66 the command counter EMF signals $\omega_e \lambda^*_{qe}$ and $\omega_e \lambda^*_{de}$ also undergo a coordinate transformation as a function of the conversion angle Φ to produce d' and q'-axis command voltage signals $V_{de}'^*$ and $V_{qe}'^*$ (i.e. d'-axis and q'-axis command counter EMF signals $\omega_e \lambda_{qe}'^*$ and $\omega_e \lambda_{de}'^*$) according to the following equations:

$$V_{de}'^* = -(\omega_e \lambda^*_{de})(\sin \Phi) - (\omega_e \lambda^*_{qe})(\cos \Phi) \quad (10)$$

$$V_{qe}'^* = (\omega_e \lambda^*_{de})(\cos \Phi) - (\omega_e \lambda^*_{qe})(\sin \Phi) \quad (11)$$

The d'-axis voltage signal $V'_{deF}$ and the d'-axis command voltage signal $V_{de}'^*$ are both in quadrature with the stator current and therefore, both of these values are free from contamination due to stator resistance effects (i.e. there is no $i'_{de}$ or $i^*_{de}$ component and therefore there can be no $r_s i'_{de}$ or $r_s i_{de}'^*$ voltage drop). According to Equation 7, the d'-axis feedback voltage signal is equal to the actual d'-axis counter EMF $\omega_e \lambda'_{qe}$.

By subtracting the d'-axis command counter EMF $\omega_e \lambda_{qe}'^*$ (or $V_{de}'^*$) from the d'-axis counter EMF $\omega_e \lambda'_{qe}$ (or $V'_d$) an error signal can be derived. To this end, the d'-axis voltage signal $V'_{deF}$ (or $\omega_e \lambda'_{qe}$) and the d'-axis command voltage signal $V_{de}'^*$ (or $\omega_e \lambda_{qe}'^*$) are fed to summer 70 where they are differenced to generate the voltage error signal $V'_{derr}$. A controller uses the voltage error signal $V'_{derr}$ to alter the invertor frequency through the slip gain so that the d'-axis voltage $V'_{deF}$ (or $\omega_e \lambda'_{qe}$) is identical to the d'-axis command voltage $V_{de}'^*$ (or $\omega_e \lambda_{qe}'^*$). The details of the circuitry for a suitable controller to conform the d'-axis voltage $V'_{deF}$ to the d'-axis command voltage $V_{de}'^*$ have been previously shown and described in Kerkman, et al., U.S. Pat. No. 5,298,847 issued Mar. 29, 1994 which is incorporated herein by reference.

The q'-axis voltage signal $V'_{qeF}$ and q'-axis command voltage signal $V_{qe}'^*$, unlike their d'-axis counterparts, are highly dependent on stator resistance $r_s$ and thus include stator resistance information. The q'-axis voltage $V'_{qeF}$ and command voltage $V_{qe}'^*$ signals are differenced at summer 72 to generate a q'-axis voltage error signal $V'_{qerr}$.

The d and q-axis command currents $i^*_{de}$, $i^*_{qe}$ are also provided to block 68 which produced a q'-axis command current signal $i_q'^*$ according to Equation 12 below:

$$i_{qe}'^* = \sqrt{i_{de}^2 + i_{qe}^2} \quad (12)$$

Because the q'-axis is in phase with the stator current $i_s$, the q'-axis current is equal to the q'-axis commanded current $i_{qe}'^*$ (i.e. is equal to the stator current $i_s$).

The q'-axis voltage error signal $V'_{qerr}$ is divided by the q'-axis command current signal $i_q'^*$ at block 74 to produce the stator resistance estimate $\hat{r}_s$.

Figure 3:
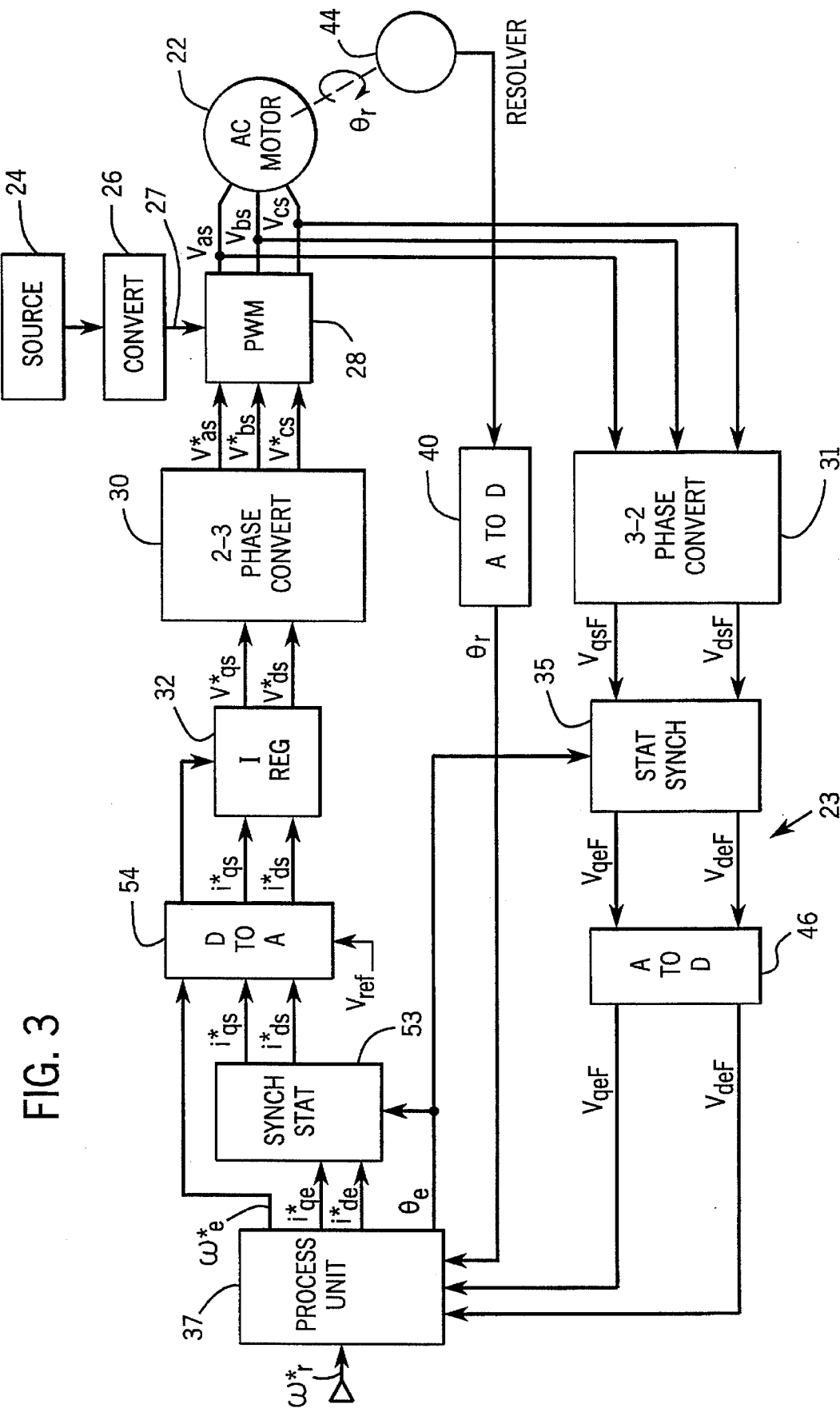
FIG. 3 provides an overall block diagram of a control system for use in controlling an AC induction motor according to the present invention.

Referring now to FIG. 3, the present invention will be described in the context of a current regulated pulse width modulated (PWM) motor control 23 that receives a command velocity signal $\omega^*_r$ and produces voltage pulse trains $V_{as}$, $V_{bs}$ and $V_{cs}$ to drive a motor 22 at the command velocity $\omega^*_r$. A processing unit 37 determines a stator resistance estimate $\hat{r}_s$ that can be used with adaptive controllers to adjust the slip gain and field current command to maintain field orientation and flux control as described in more detail in Kerkman et al., U.S. Pat. No. 5,032,771 issued Jul. 16, 1991.

The motor control 23 (also called a "drive") includes a power section that receives power at a line frequency of 60 Hz from a three phase AC power source 24. The three phases of the power source are connected to an AC/DC power converter 26 and the power section of the drive. The AC/DC power converter 26 rectifies the alternating current signals from the AC source 24, to produce a DC voltage (VDC) on a DC bus 27 that connects to power inputs on a pulse width modulating (PWM) invertor 28, which completes the power section of the drive. The AC source 24, the AC/DC power converter 26, and DC bus 27 provide a DC source for generating a DC voltage of constant magnitude. The PWM invertor 28 includes a group of switching elements which are turned on and off to convert this DC voltage to pulses of constant magnitude.

The pulse train pattern from a PWM invertor is characterized by a first set of positive going pulses of constant magnitude but of varying pulse width followed by a second set of negative going pulses of constant magnitude and of varying pulse width. The RMS value of this pulse train pattern approximates one cycle of a sinusoidal AC waveform. The pattern is repeated to generate additional cycles of the AC waveform. To control the frequency and magnitude of the resultant AC power signals to the motor, AC invertor control signals are applied to the PWM invertor.

The processing unit 37 produces d and q-axis digital synchronous command current signals $i^*_{qe}$, $i^*_{de}$ and a digital electrical velocity signal $\omega^*_e$ to drive the PWM invertor 28. Because the invertor 28 responds to stationary, analog, three phase voltage signals, the command current signals $i^*_{qe}$ and $i^*_{de}$ and velocity signal $\omega^*_e$ must be converted accordingly. To this end, the command current signals $i^*_{qe}$, $i^*_{de}$ are provided to a synchronous-to-stationary converter 53 that transforms the signals into the stationary reference frame according to the following matrix equation:

$$\begin{bmatrix} i^*_{qs} \\ i^*_{ds} \end{bmatrix} = \begin{bmatrix} \cos\theta & \sin\theta \\ -\sin\theta & \cos\theta \end{bmatrix} \begin{bmatrix} i^*_{qe} \\ i^*_{de} \end{bmatrix} \quad (13)$$

Next, the stationary command current signals $i^*_{qs}$, $i^*_{ds}$ and angular velocity signal $\omega^*_e$ are provided to a digital-to-analog converter 54. At the converter 54, the command current signals $i^*_{qs}$, $i^*_{ds}$ and angular velocity signal $\omega^*_e$ are multiplied by $V_{REF}$ to arrive at the proper signal level for input to the current regulator 32. The details of the current regulator 32 have been previously shown and described in Kerkman, et al., U.S. Pat. No. 4,680,695 issued Jul. 14, 1987, and that patent is incorporated herein by reference.

The current regulator 32 produces d and q-axis voltage command signals $V^*_{ds}$, $V^*_{qs}$ which are provided to a 2-3 phase converter 30 as well known in the art. The q-axis leads the d-axis by 90° in phase difference. The 2-3 phase converter 30 converts the d and q-axis voltage command signals $V^*_{ds}$, $V^*_{qs}$ into three phase balanced voltage command signals $V_{as}^*$, $V_{bs}^*$, and $V_{cs}^*$ to drive the PWM invertor 28. The balanced voltage signals vary in phase by 120°.

The PWM voltage invertor 28 receives the three balanced voltage command signals. The magnitude and the frequency of these signals determines the pulse widths and the number of the pulses in pulse trains $V_{as}$, $V_{bs}$, and $V_{cs}$ which are applied to the terminals of the motor. The voltages $V_{as}$, $V_{bs}$, and $V_{cs}$ are phase voltage signals incorporated in the line-to-line voltage observed across the stator terminals.

Two main control loops are provided that include various converters and sensors that supply information to the processing unit 37 for use in determining how the command currents $i^*_{qe}$, $i^*_{de}$ must be altered to drive the motor 22 at the command velocity $\omega^*_r$. The first is a feedback loop that supplies winding voltage information. The second is either a feedback or observer loop that provides position information.

In the first loop, stator voltages $V_{as}$, $V_{bs}$, $V_{cs}$ across the stator windings are sensed using voltage sensing devices (not shown) of a type known in the art. The signals $V_{as}$, $V_{bs}$, $V_{cs}$ are fed back through a 3 to 2 phase converter 31 that produces d and q-axis feedback voltage signals $V_{qsF}$ and $V_{dsF}$. The feedback signals $V_{qsF}$ and $V_{dsF}$ are received by a stationary-to-synchronous transformer 35 which transforms the voltages from the stationary reference frame to a synchronous reference frame producing feedback voltage signals $V_{qeF}$ and $V_{deF}$ according to the following matrix equation:

$$\begin{bmatrix} V_{qeF} \\ V_{deF} \end{bmatrix} = \begin{bmatrix} \cos\theta & -\sin\theta \\ \sin\theta & \cos\theta \end{bmatrix} \begin{bmatrix} V_{qsF} \\ V_{dsF} \end{bmatrix} \quad (14)$$

The synchronous signals are passed through an analog-to-digital converter 46 producing digital feedback voltage signals. The voltage feedback quantities $V_{qeF}$ and $V_{deF}$ become inputs to routines run by the processing unit 37.

The second control loop may includes a position detector or a position observer. The position detector may be a resolver 44 that is coupled to the motor 22. The position observer estimates the position through techniques known in the art and generates a rotor position signal $\theta_r$. As the rotor rotates, the position is determined either through the sensor or the observer. The rotor position signal $\theta_r$ is provided to an A to D converter 40 which produces a digital rotor position signal. The velocity is then estimated by any of the techniques known in the art by the processing unit 37.

Figure 4:
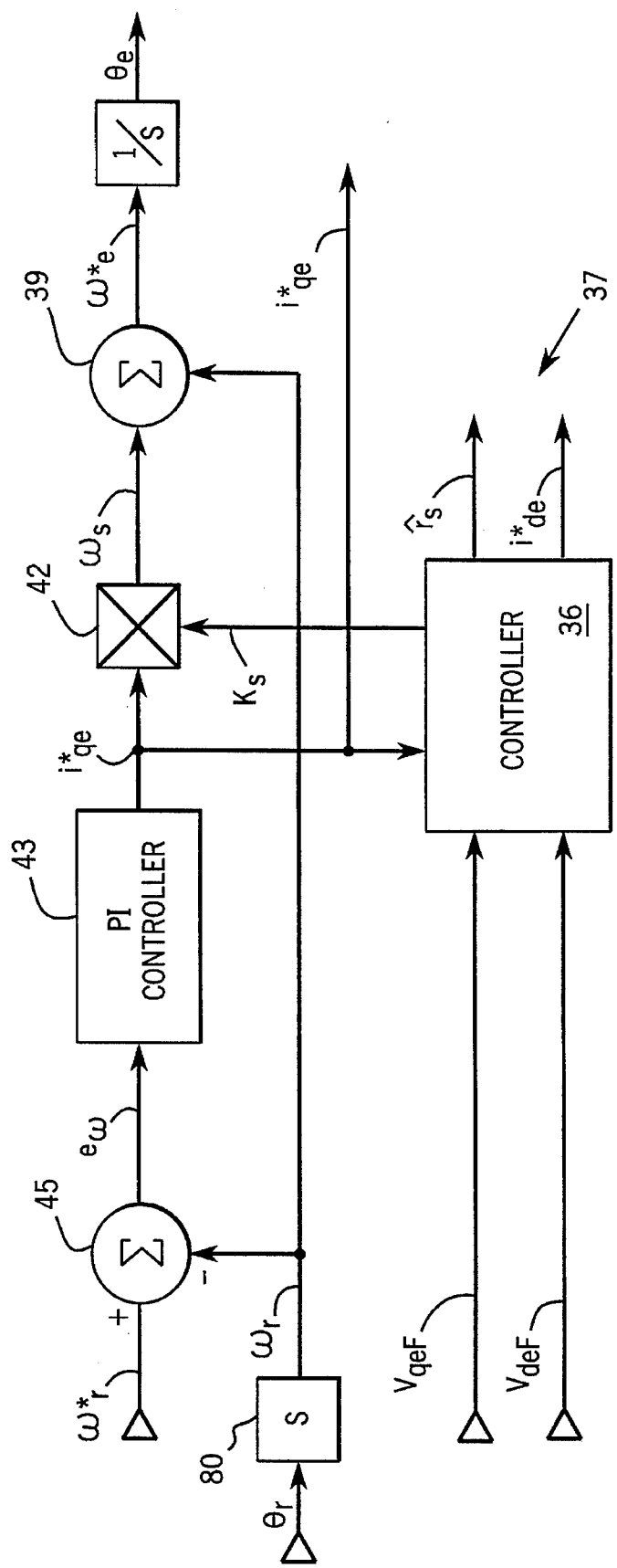
FIG. 4 provides a detailed block diagram of a processing unit of FIG. 3.

Referring now to FIG. 4, the processing unit 37 includes a controller 36 and various other components which will be described in more detail below. The rotor position signal $\theta_r$ is operated on by a differential operator 80 to form a rotor velocity estimate $\omega_r$. The rotor velocity signal $\omega_r$ is subtracted from the command velocity $\omega^*_r$ at summer 45 to produce a velocity error signal $e_\omega$. The error signal $e_\omega$ is provided to a proportional-integral (PI) controller 43 that produces a torque-related q-axis command current signal $i^*_{qe}$. The q-axis command current signal $i^*_{qe}$ is provided to a multiplier 42 and the controller 36.

Figure 5:
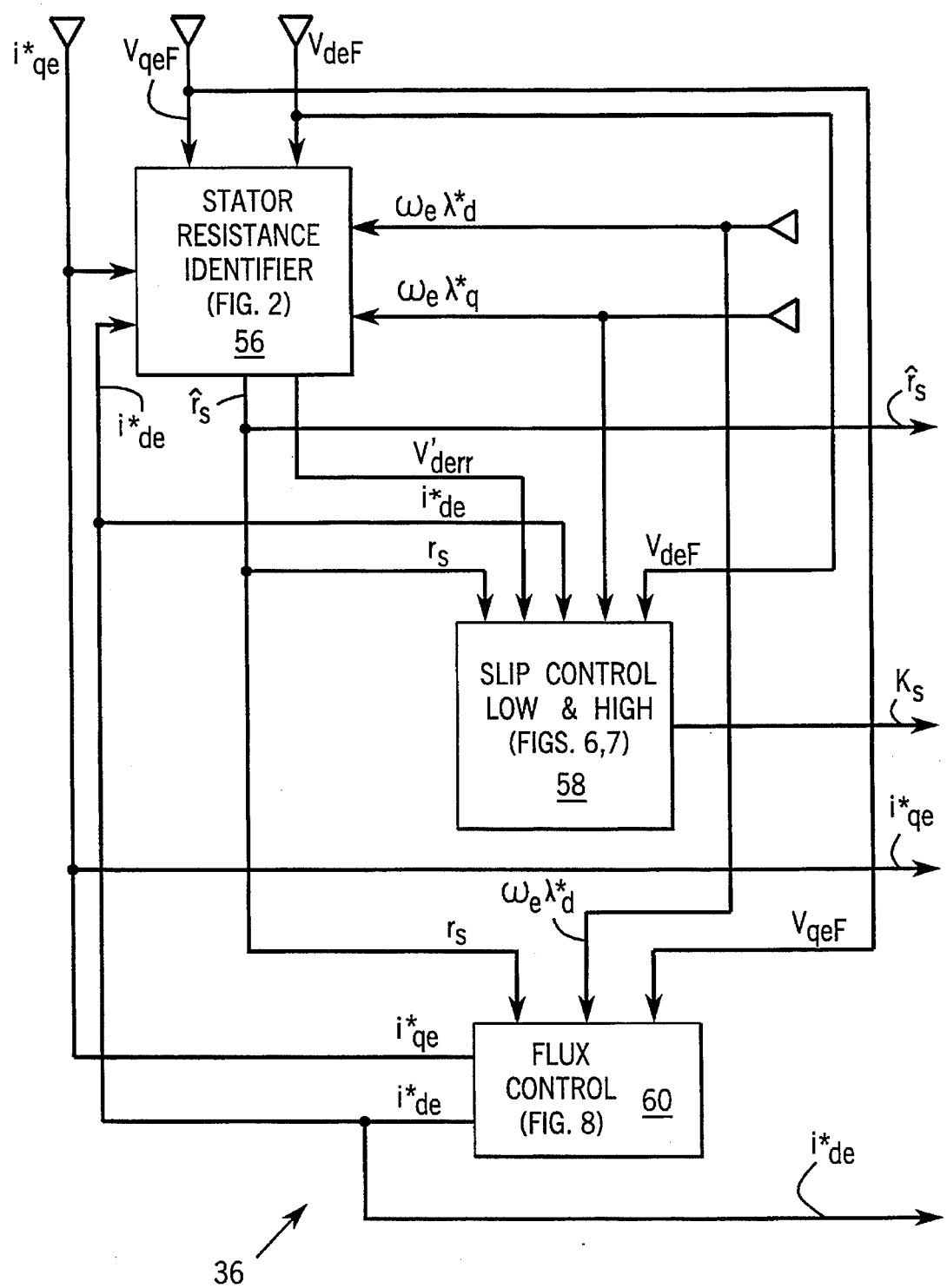
FIG. 5 provides a block diagram of the major process program routines within the software for the digital controller shown in FIG. 4.

Referring now to FIG. 5, the controller 36 consists of a plurality of different control mechanisms including a stator resistance identifier 56, a slip control for both low and high frequencies 58, and a flux control 60. As explained above in reference to FIG. 2, the stator resistance identifier 56 receives the voltage feedback signals $V_{qeF}$, $V_{deF}$ and command current and counter EMF signals $i^*_{de}$, $i^*_{qe}$, $\omega_e\lambda^*_{de}$, $\omega_e\lambda^*_{qe}$ produces a d'-axis voltage error signal $V'_{derr}$ and a stator resistance estimate $\hat{r}_s$. Once the d'-axis voltage signal $V'_{derr}$ and the stator resistance estimate $\hat{r}_s$ are determined, these values can be used in the dq frame of reference to control the motor.

Figure 6:
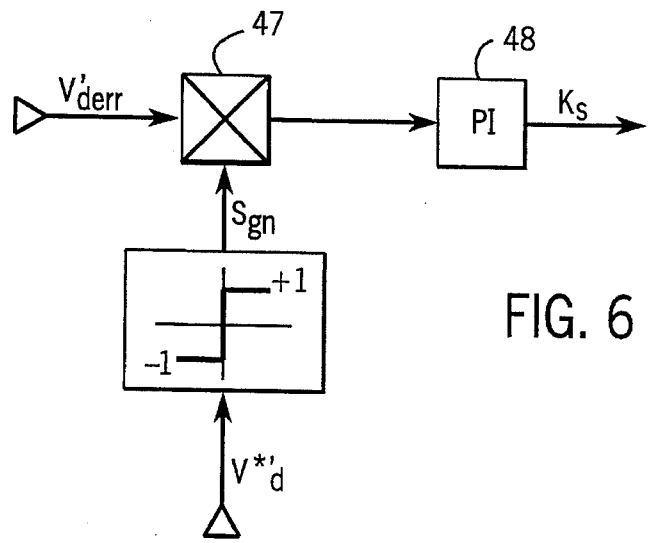
FIG. 6 is a detailed block diagram of the low speed slip control shown in FIG. 5.
Figure 7:
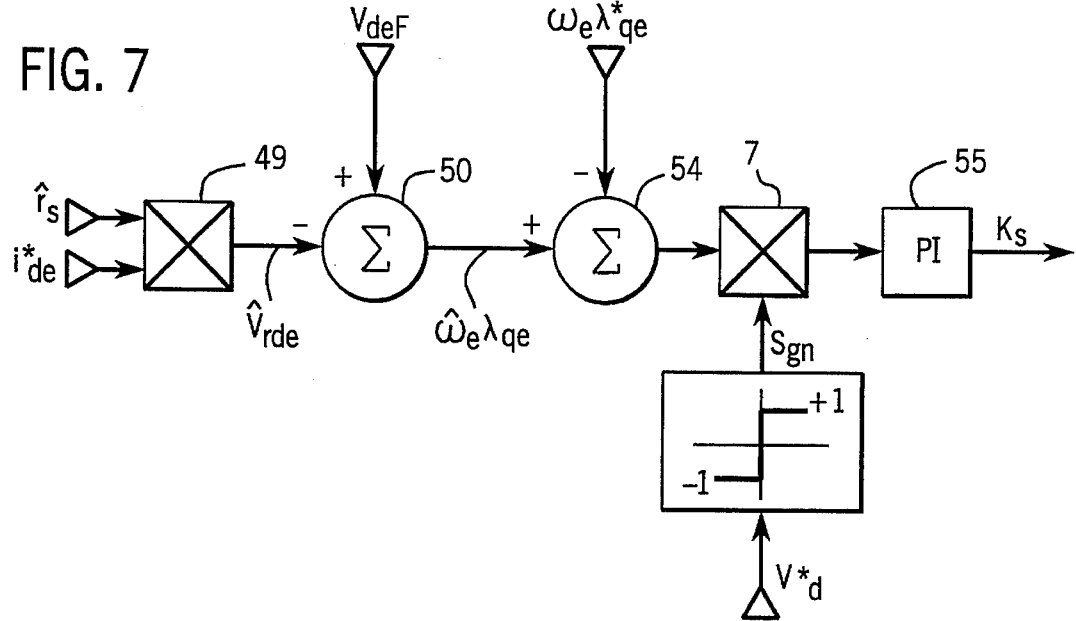
FIG. 7 is a detailed block diagram of the high speed slip control shown in FIG. 5.

Referring also to FIGS. 6 and 7, the slip control 58 includes different control mechanisms for high and low speed control. Referring to FIG. 6, when motor speed is less than a predetermined value, say 30 Hz, the d'-axis voltage error $V'_{derr}$ is multiplied by the sign of the d'-axis voltage command $V^*{}'_d$ at multiplier block 47 and the resulting signal is provided to a proportional-integral (PI) controller 48 to produce a slip constant $K_s$.

Referring to FIG. 7, when the motor speed is greater than 30 Hz, the stator resistance estimate $\hat{r}_s$ is multiplied by the d-axis command current $i_{de}^*$ at multiplier block 49 to produce a d-axis voltage estimate signal $\hat{V}_{rde}$. The d-axis voltage estimate signal $\hat{V}_{rde}$ is subtracted from the d-axis feedback voltage $V_{deF}$ at summer 50 to produce an estimated d-axis counter EMF $\hat{\omega}_e\lambda_{qeF}$. The d-axis command counter EMF $\omega_e\lambda^*_{qe}$ is subtracted from the d-axis estimated counter EMF $\hat{\omega}_e\lambda_{qeF}$ at summer 54 and the resulting signal is multiplied by the sign of the d-axis voltage command $V^*_d$ at multiplier block 7. The resulting signal is provided to a PI controller 55 which provides the slip constant $K_s$.

Referring again to FIG. 4, the slip constant value $K_s$ is multiplied by the q-axis command current signal $i^*_{qe}$ at multiplier 42. The product is the slip angular velocity $\omega_s$. The slip angular velocity $\omega_s$ is summed with the rotor angular velocity at summer 39 to produce the electrical frequency $\omega^*_e$. Integrating the electrical frequency $\omega^*_e$ at integrator 8 provides the electrical angular position $\theta_e$ which is used by the stationary to synchronous and synchronous to stationary converters 35, 53.

Figure 8:
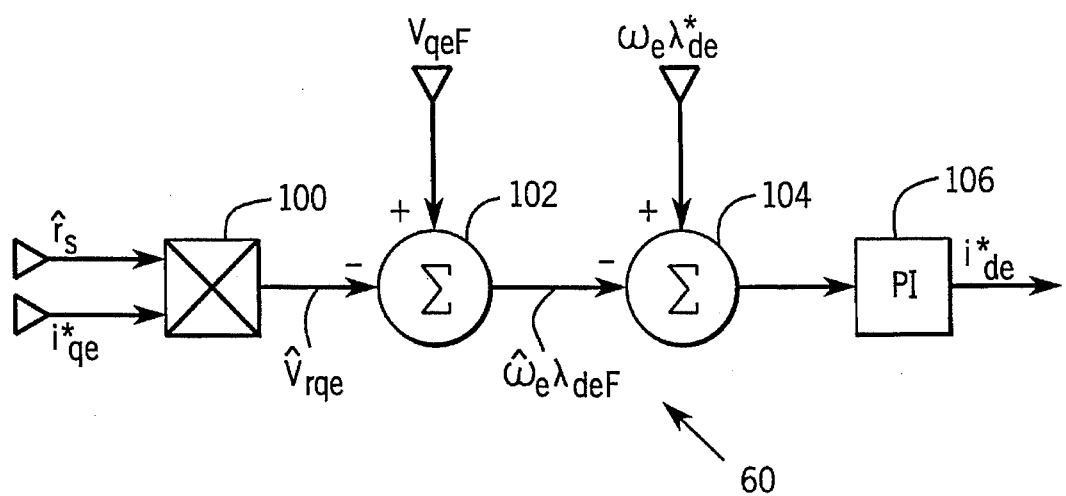
FIG. 8 is a detailed block diagram of the flux control mechanism shown in FIG. 5.
Figure 9:
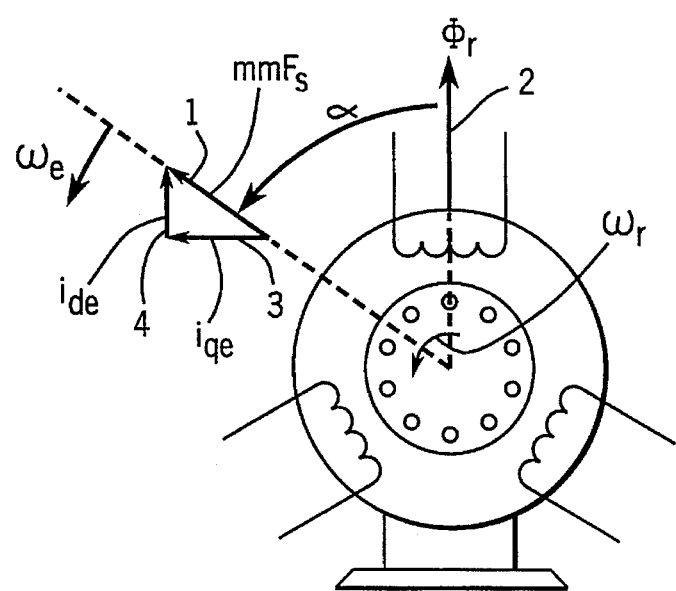
FIG. 9 schematic view in cross-section of an induction motor showing instantaneous locations of the rotor flux, the stator mmf, and the torque and flux components of the stator mmf.

Referring now to FIG. 8, the flux control 60 is similar to the high speed slip control shown in FIG. 7. The flux control 60 receives the stator resistance estimate $\hat{r}_s$ and the q-axis command current signal $i^*_{qe}$ and multiplies the two values at multiplier 100 to produce a q-axis voltage estimate $\hat{V}_{rqe}$. The q-axis estimate $\hat{V}_{rqe}$ is subtracted from the q-axis feedback voltage signal $V_{qeF}$ at summer 102 to produce an estimated q-axis counter EMF $\hat{\omega}_e\lambda_{deF}$. The estimated counter EMF $\hat{\omega}_e\lambda_{de}$ is subtracted from the command counter EMF $\omega_e\lambda^*_{de}$ at summer 104 and the resulting signal is provided to a proportional-integral controller 106 to produce the d-axis command current signal $i^*_{de}$.

The stator resistance estimate could be used for a plurality of different motor control purposes. In the present application, the stator resistance estimate is described as being used to determine both the angular electrical velocity $\omega^*_e$ and d-axis current command signal $i^*_{de}$.

Thus, a simple and non-intrusive method of determining stator winding resistance has been disclosed. While a technique for controlling rotor velocity using the resistance estimate has been disclosed, the inventive part of the disclosure is limited to a method and apparatus for determining a stator resistance estimate by shifting to the d'q' frame of reference and calculating the stator resistance in that frame after correcting the counter EMF values.

While this description has been by way of example of how the present invention can be carried out, those with experience in the art will recognize that various details may be modified to design other detailed embodiments, and that many of these embodiments will come within the scope of the invention.

For example, the invention could be used with many different feedback loop configurations or motor controllers that operate in the dq frame of reference. In addition, the resistance estimate can be used for many different motor control operations including, but not limited to, temperature monitoring using a look-up table or other scale means. Moreover, while an apparatus has been described, the invention is not so limited and should include a method wherein feedback voltages are converted into d and q-axis components in a synchronous dq frame of reference, the phase angle of the current vector in the dq frame of reference is determined, the $V_{de}$ and $V_{qe}$ voltage components are operated on to generate new voltage components $V'_{de}$, $V'_{qe}$ in a new coordinate frame of reference where the q'-axis is defined by the phase angle and the d'-axis in quadrature with the q'-axis, and the voltage component $V_{de'}$ does not include a voltage drop component. The method also includes determining the value of the current command vector, operating on a command counter EMF components to generate new q' and d'-axis command counter EMF components, forcing the d'-axis voltage component $V'_{de}$ to conform to the d'-axis command counter EMF component, whereby such conforming also conforms a q'-axis counter EMF component to a q'-axis command counter EMF component, mathematically combining the q'-axis voltage component $V'_{qe}$ and the q'-axis command counter EMF to produce a voltage error signal, and mathematically combining the voltage error signal and the current command vector to produce a stator resistant estimate.

Therefore, to apprise the public of the scope of the invention and the embodiments covered by the invention the following claims are made:

I claim:

1. A stator resistance estimator for use with a motor control system, the control system altering motor operation in response to a current command vector in a dq frame of reference, and in which d and q-axis stator feedback voltages are used for motor control purposes, each feedback voltage including a voltage drop component attributable to a stator resistance and a counter EMF component attributable to a rotor field, the estimator comprising:

(a) a calculator determining a phase angle of the current command vector in the dq frame of reference;

(b) a voltage converter operating on said d and q-axis feedback voltages to generate d' and q'-axis voltages in a new coordinate frame of reference where the q'-axis is defined by the phase angle, the d'-axis is in quadrature with the q'-axis, and the d'-axis voltage does not include a voltage drop component;

(c) a corrector to force the d'-axis voltage to be equal to a d'-axis command EMF component;

(d) an EMF identifier for determining the value of a q'-axis command EMF component;

(e) a summer for mathematically combining the q'-axis voltage and the q'-axis command EMF producing a q'-axis voltage error signal; and (f) a divider for mathematically combining the q'-axis voltage error signal and command current vector producing the stator resistance estimate.

2. The estimator as recited in claim 1 wherein the summer mathematically combines by subtracting the q'-axis command EMF from the q'-axis voltage and the divider mathematically combines by dividing the voltage error signal by the command current vector.

3. The estimator as recited in claim 2 further including a current identifier that determines the value of the command current vector by determining a q'-axis current component of the command current vector.

4. The estimator as recited in claim 1 wherein the current command vector has both d and q-axis current components and the calculator includes a divider to divide the d-axis current component by a q-axis current component to produce a current ratio and an arctangent module for taking the arctangent of said ratio to produce the phase angle.

5. The estimator as recited in claim 1 wherein the voltage converter generates the q'-axis voltage according to the equation:

$$V'_{qe} = V_{qe} \cos \Phi + V_{de} \sin \Phi$$

where $\Phi$ is the phase angle, $V_{qe}'$ is the q'-axis voltage, $V_{de}$ is the d-axis voltage, and $V_{qe}$ is the q-axis voltage.

6. The estimator as recited in claim 3 wherein the current identifier generates the q'-axis current component according to the equation:

$$i_{qe}^{'*} = \sqrt{i_{de}^{*2} + i_{qe}^{*2}}$$

where $i^*_{de}$ is the d-axis command current component, $i^*_{qe}$ is the q-axis command current component, and $i_{qe}'^*$ is the q'-axis command current component.

7. The estimator as recited in claim 1 wherein the EMF identifier generates the q'-axis command EMF component according to the equation:

$$\omega_e \lambda_{de}'^* = (\omega_e \lambda^*_{de})(\cos \Phi) - (\omega_e \lambda^*_{qe})(\sin \Phi)$$

where $\Phi$ is the phase angle, $\omega_e \lambda^*_{de}$ is the q-axis command counter EMF component, $-\omega_e \lambda^*_{qe}$ is the d-axis command counter EMF component and $\omega_e \lambda^*_{de}{}^*$ is the q'-axis command EMF component.

8. A method to be used with a motor control system for determining a stator resistance estimate, the control system altering motor operation in response to a current command vector in a dq frame of reference, and in which d and q-axis stator feedback voltages are used for motor control purposes, each feedback voltage including a voltage drop component attributable to a stator resistance and a counter EMF component attributable to a rotor field, the method comprising the steps of:

(a) determining a phase angle of the current command vector in the dq frame of reference;

(b) operating on said d and q-axis feedback voltages to generate d' and q'-axis voltages in a new coordinate frame of reference where the q'-axis is defined by the phase angle, the d'-axis is in quadrature with the q'-axis, and the d'-axis voltage does not include a voltage drop component;

(c) forcing the d'-axis voltage to be equal to a d'-axis command EMF component;

(d) determining the value of a q'-axis command EMF component;

(e) mathematically combining the q'-axis voltage and the q'-axis command EMF producing a q'-axis voltage error signal; and (f) mathematically combining the q'-axis voltage error signal and command current vector producing the stator resistance estimate.

9. The method as recited in claim 8 wherein the step of mathematically combining the q'-axis command EMF and the q'-axis voltage includes the step of subtracting the q'-axis command EMF from the q'-axis voltage and the step of mathematically combining the voltage error signal and the command current vector includes the step of dividing the voltage error signal by the command current vector.

10. The method as recited in claim 8 further including the step of, prior to mathematically combining the voltage error signal and the command current vector, determining the value of the command current vector by determining the value of a q'-axis current component of the command current vector.

11. The method as recited in claim 8 wherein the current command vector has both d and q-axis current components and the step of determining a phase angle includes the steps of dividing a d-axis current component by a q-axis current component to produce a current ratio and taking the arctangent of said ratio to produce the phase angle.

12. The method as recited in claim 8 wherein the step of generating the q'-axis voltage is performed in accordance with the equation:

$$V'_{qe} = V_{qe} \cos \Phi + V_{de} \sin \Phi$$

where $\Phi$ is the phase angle, $V'_{qe}$ is the q'-axis voltage, $V_{de}$ is the d-axis voltage, and $V_{qe}$ is the q-axis voltage.

13. The method as recited in claim 8 wherein the step of determining the value of the command current vector is performed in accordance with the equation:

$$i_{qe}^{'*} = \sqrt{i_{de}^{*2} + i_{qe}^{*2}}$$

where $i^*_{de}$ is the d-axis command current component, $i^*_{qe}$ is the q-axis command current component, and $i^*_{qe}$ is the q'-axis command current component.

14. The method as recited in claim 8 wherein the step of generating the q'-axis command EMF component is performed in accordance with the equation:

$$\omega_e \lambda_{de}'^* = (\omega_e \lambda_{de}^*)(\cos \Phi) - (\omega_e \lambda^*_{qe})(\sin \Phi)$$

where $\Phi$ is the phase angle, $\omega_e \lambda_{de}^*$ is the q-axis command counter EMF component, $-\omega_e \lambda^*_{qe}$ is the d-axis command counter EMF component and $\omega_e \lambda_{de}'^*$ is the q'-axis command EMF component.

* * * * *